(12) United States Patent
Xu et al.

(10) Patent No.: US 8,417,669 B2
(45) Date of Patent: Apr. 9, 2013

(54) AUTO-CORRECTION IN DATABASE REPLICATION

(75) Inventors: Chengzi Xu, Shanghai (CN); Stephen C. Shepherd, Lakewood, CO (US)

(73) Assignee: Sybase Inc., Dublin, CA (US)

( * ) Notice: Subject to any disclaimer, the term of this patent is extended or adjusted under 35 U.S.C. 154(b) by 0 days.

(21) Appl. No.: 13/150,955

(22) Filed: Jun. 1, 2011

(65) Prior Publication Data

US 2012/0310885 A1 Dec. 6, 2012

(51) Int. Cl.
*G06F 17/00* (2006.01)

(52) U.S. Cl. .................................................. 707/638

(58) Field of Classification Search ........... 707/615–639
See application file for complete search history.

(56) References Cited

U.S. PATENT DOCUMENTS

| | | | |
|---|---|---|---|
| 7,590,736 B2 * | 9/2009 | Hydrie et al. | 709/226 |
| 2005/0055435 A1 * | 3/2005 | Gbadegesin et al. | 709/224 |
| 2011/0153568 A1 * | 6/2011 | Shang et al. | 707/648 |
| 2011/0246630 A1 * | 10/2011 | Deutsch et al. | 709/222 |

* cited by examiner

*Primary Examiner* — Wilson Lee
(74) *Attorney, Agent, or Firm* — Sterne, Kessler, Goldstein & Fox P.L.L.C.

(57) ABSTRACT

Systems, methods and computer program product embodiments for auto-correction in database replication are disclosed herein. An embodiment includes receiving a log record of one or more database row changes on a table marked for replication. From the received log record, one or more insert operations on the marked table are identified. Each identified insert operation is automatically replaced with a first pair of operations, where each first pair comprises a delete operation associated with a new insert operation. Each first pair, when executed at a replicate database, acts to delete data at a first location identified by each identified insert operation prior to inserting data of the new insert operation at the first location. The embodiment further includes identifying, from the log record, one or more update operations on the marked table, and automatically replacing each identified update operation with a second pair of operations, where each second pair comprises a new delete operation associated with a new insert operation.

17 Claims, 7 Drawing Sheets

AUTO-CORRECTION IN DATABASE REPLICATION

BACKGROUND

1. Field

Embodiments of the present invention relate to database systems, and more particularly to database replication.

2. Background

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

In data replication, materialization is a process that creates and activates subscriptions between a source (or primary) database and a replicate (or target) database, and copies data from the primary database to the replicate database, so that both databases contain identical data. Materialization can thus replace existing data (if any) in the replicate database with data from the source database.

A subscription allows a destination table in the replicate database to receive initial data from a primary (or source) table in the primary database through materialization, and to begin receiving subsequent replicated data updates. When users create publication subscriptions for publications created at a primary replication server, the replication server creates an article subscription for each article in the publication. When publication subscriptions are materialized atomically, non-atomically, or incrementally, one article subscription may be processed at a time. When publication subscriptions are materialized using "bulk" or no materialization methods, article subscriptions may be processed together.

When database transactions arrive at a replicate database While materialization (e.g., non-atomic materialization) is still in process, update or insert operations on data at the primary database can result in discrepancies such as duplicate rows at the replicate database. Discrepancies that may occur during materialization can also result in missing rows in a replicated table. Such discrepancies, including any failed replication operations, can corrupt data in the replicate database, affecting subsequent replication operations.

BRIEF SUMMARY

Briefly stated, the invention includes system, method, and computer program product embodiments, and combinations and sub-combinations thereof, for auto-correction in database replication.

An embodiment includes receiving a log record of one or more database row changes on a table marked for replication ("marked table"). From the received log record, one or more insert operations on the marked table are identified. Each identified insert operation (e.g., INSERT statement) is automatically replaced with a first pair of operations, where each first pair comprises a delete operation (e.g., DELETE statement) associated with a new insert operation. Each first pair, when executed at a replicate database, acts to delete data at a first location identified by each identified insert operation prior to inserting data of the new insert operation at the first location. As an example, the first location may be specified as any column, row or cell in a database table.

The embodiment further includes identifying, from the log record, one or more update operations on the marked table, and automatically replacing each identified update operation (e.g., UPDATE statement) with a second pair of operations, where each second pair comprises a new delete operation associated with a new insert operation. Each second pair, when executed at a replicate database, acts to delete data at a second location identified by the update operation prior to inserting data of the new insert operation at the second location.

In this way, by deleting data stored at a location prior to inserting data at the location, embodiments of the invention automatically remove any corrupted data that may have been present at the location, thereby auto-correcting a replicated table generated at a replicate or target database. Because any corrupted data is automatically removed, subsequent replication operations are not affected by the corrupted data, This results in increased replication reliability. Furthermore, auto-correction performed by the embodiments is accomplished in real-time (or "on-the-fly") as a replicated table is being generated at the replicate database. In this way, replication processes need not be interrupted.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
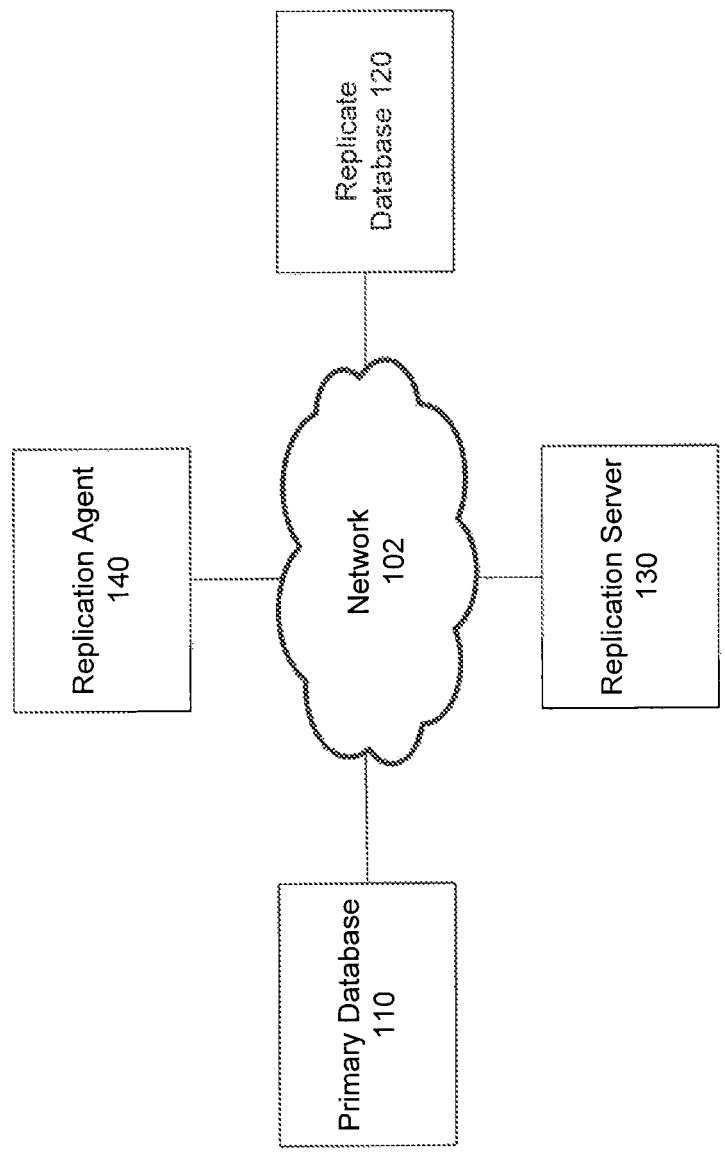
FIG. 1 is a diagram of an exemplary replication environment, according to an embodiment.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Embodiments of the present invention relate to systems, methods and computer program products for auto-correction in database replication.

While embodiments of the present invention are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This section describes a system architecture for auto-correction in database replication, according to an embodiment of the invention illustrated in FIG. 1.

FIG. 1 includes primary database 110, replication agent 140, replication server 130 and replicate database 120. While the following is described in terms of update, insert and delete database replication operations on marked tables, the invention is not limited to these operations and any other database operations and tables may be used. The invention is applicable to any system having generally the structure of FIG. 1, or that would benefit from the operation, methods and functions as described herein.

Primary database 110 may be any form of database and can include, but is not limited to, a device having a processor and memory for executing and storing instructions. As an example, not intended to limit the invention, MICROSOFT SQL SERVER from Microsoft Corporation of Redmond, Wash., may be used as primary database 110. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, primary database 110 is a source of transactions that manipulate and/or modify data in replicate database 120. Tables marked for replication in a primary database 110 may be known as marked tables (not shown). In an embodiment, a primary table is marked for replication (e.g., marked at a replication agent) so that replication agent 140 can identify and replicate changed rows in the primary table using replication server 130.

Replication agent 140 can capture replicated row changes in primary database 110, and then may send those row changes to replication server 130 for distribution to replicate database 120. In an embodiment, replication agent 140 provides a log record of one or more row changes at primary database 110 to replication server 130. In an embodiment, not intended to limit the invention, when an auto-correction flag is set on a primary database table marked for replication, replication agent 140 determines that auto-correction is enabled for the marked table. With auto-correction enabled, replication agent 140 sends all columns for every row changed (or "full log") to replication server 130. With auto-correction disabled, replication agent 140 sends only the changed columns for every row changed (or "change log") to replication server 130. In other words, and according to an embodiment, replication agent 140 provides a change log when auto correction is false (or disabled), and a full log when auto correction is true (or enabled). Auto-correction using replication agent 140 is described in greater detail further below.

In an embodiment, replication agent 140 runs as a standalone application, independent of primary database 110, replication server 130, and any other replication system component. In another embodiment, replication agent 140 may reside on the same host machine as, for example, primary database 1.10 or any other replication system component.

Replication server 130 can receive, from replication agent 140, row changes that are to be replicated at replicate database 120. In an embodiment, replication server 130 may send replicated row changes to replicate database 120 in response to one or more commands from replication agent 140. In an embodiment, replicate database 120 includes one or more replicated tables (not shown) that correspond to one or more marked tables at primary database 110. When replicated row changes are, for example, processed successfully by replicate database 120, replicated tables in replicate database 120 are synchronized with corresponding marked tables in primary database 110.

Network 102 can be any type of network or combination of networks such as, but not limited to, a local area network, wide area network or the Internet. Network 102 can be a form of a wired network or a wireless network, or a combination thereof. Network 102 can allow primary database 110, replication server 130, replication agent 140, replicated database 120 and any other networked components to communicate with each other.

Components of system 100 (i.e., replication agent 140, primary database 110, replication server 130 and replicate database 120) can be computing devices including one or more processors and may further include one or more modules implemented using one or more processors. Components of system 100 can include any form of physical storage such as hard-disk drives, flash drives, random access memory (RAM), and any computer-readable or computer-useable storage media that may be configured to store instructions and data. An example computer useful for implementing components of the embodiments is described further below.

In an embodiment, replication server 130 receives, from replication agent 140, a log record of one or more database row changes on a marked table in primary database 110. In an embodiment, replication server 130 receives, from replication agent 140, a log record of all database row changes on a marked table in primary database 110. Replication server 130 reviews (or parses) the log record to identify one or more insert operations (e.g., SQL INSERT statements) on the marked table. Each identified insert operation is then replaced by replication server 130 with a pair of operations, where each pair comprises a delete operation (e.g., SQL DELETE statement) associated with another insert operation. Each pair of operations, when executed at replicate database 120, deletes data at a location identified by the insert operation prior to inserting data of the insert operation at the location. In an embodiment, at replication server 130 an auto-correction flag can only be set on a replication definition. In an embodiment, the above noted replacement operation occurs when the auto-correction flag is set. As an illustrative and non-limiting example, the following command executed at replication server 130 can be used to enable auto-correction:

"set auto-correction on
for rep_def_US
with replicate at SYDNEY_DS.pubs2"

In an embodiment, in addition to identifying one or more insert operations in the log record, replication server 130 also identifies one or more update operations (e.g. SQL UPDATE statements) in the log record. Each identified update operation is then replaced by replication server 130 with a pair of operations, where each pair comprises a delete operation (e.g., SQL DELETE statement) associated with another insert operation that inserts data that is to be updated by the update operation. In other words, any new data (or updated data) provided by the update operation is now inserted using an insert operation (instead of using the update operation itself) at the same location identified by the update operation after any data previously resident at the location is deleted by the delete operation.

Updated or auto-corrected row changes, including statement pairs that have replaced update and insert statements, are then provided by replication server 130 to replicate database 120 where they may be executed. As discussed earlier, each pair of operations, when executed at replicate database 120, acts to delete data at a location identified by the insert and/or update operation prior to inserting data of the insert and/or update operation at the location. Also, for example, the insert and/or update operations may operate on the same location or different locations.

In this way, by deleting data stored at a location prior to inserting data at the location, embodiments of the invention automatically remove any corrupted data that may have been present at the location, thereby auto-correcting a replicated table generated at replicate database 120. Because corrupted data is automatically removed, subsequent replication operations are not affected by the corrupted data. This results in increased replication reliability. Furthermore, auto-correction performed by embodiments of the invention is accomplished in real-time (or on-the-fly) as a replicated table is being generated at replicate database 120. In this way, replication processes need not be interrupted.

Figure 2:
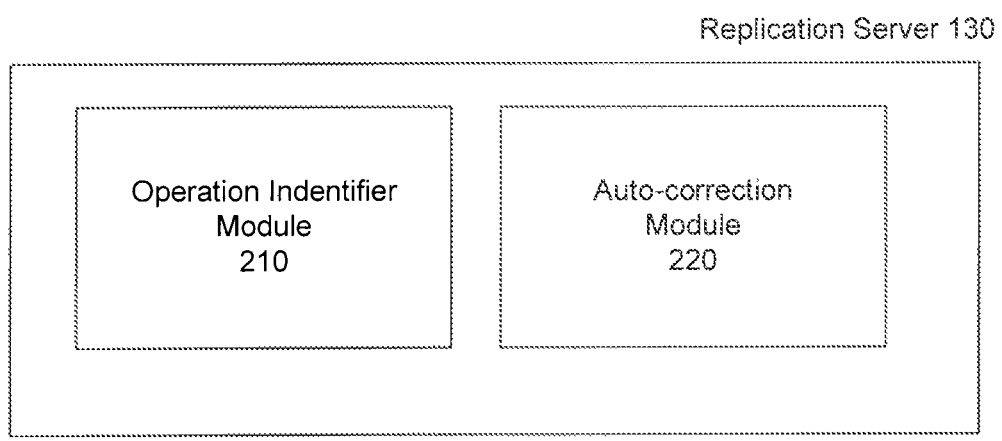
FIG. 2 is a diagram illustrating a replication server, according to an embodiment.

In an embodiment, as shown in FIG. 2, replication server 130 includes an operation identifier module 210 that is configured to review (or parse) a log record received from replication agent 140 to identify one or more insert and/or update operations (e.g., SQL INSERT and UPDATE statements) on a marked table. Replication server 130 may also include an auto-correction module 220 that is configured to replace each identified insert and/or update operation with a pair of operations, where each pair comprises a delete operation (e.g., SQL DELETE statement) associated with another insert operation.

It is to be appreciated that embodiments of the present invention are not limited to insert and update operations and can be used in conjunction with any other database operations or statements. Embodiments of the invention may identify one or more insert operations in a log record and one or more update operations (or any other operations) in the log record either concurrently or separately. Embodiments of the invention may also operate on any log record that may be previously stored on replication server 130 (or any other module in system 100) prior to receiving a log record from replication agent 140.

In an embodiment, a user or a database administrator may provide instructions to replication agent 140 to enable or disable auto-correction for one or more tables marked for replication. In one embodiment, a user may, for example, provide a "ra_set_autocorrection" command to replication agent 140 to enable or disable auto-correction for one or more marked tables in primary database 110, and to return auto-correction status for a marked table to the user. By enabling or disabling auto-correction by directly providing the "ra_set_autocorrection" command to replication agent 140, a user need not provide commands directly to primary database 110 and replicate database 120.

In an embodiment, a user may provide commands (e.g., "ra_set_autocorrection") to replication agent 140 in order to set or reset an auto-correction flag for a marked table. Upon receipt of such commands, an auto-correction flag can be set or reset for the marked table by replication agent 140. In an embodiment, when a table marked for replication is unmarked, an auto-correction flag is automatically reset, disabling auto-correction for the marked table. Exemplary auto-correction commands and the auto-correction flag are discussed further below.

In a non-limiting embodiment, embodiments of the invention provide an application program interface (API) at replication agent 140. This API enables a user to provide commands to enable or disable auto-correction for one or more marked tables in primary database 110.

In an embodiment, when replication agent 140 determines that an auto-correction flag has been set for a marked table, replication agent 140 sends all columns of the marked table, instead of sending those columns that have changed responsive to an update or insert operation, to replication server 130. In another embodiment, when replication agent 140 determines that an auto-correction flag has been set for the marked table, replication agent 140 sends a log record of each database row change on the marked table in primary database 110 to replication server 130. As noted above, tables marked for replication in primary database 110 may be known as marked tables (not shown).

In this way, by providing an API at replication agent 140 to enable or disable auto-correction, and causing replication agent 140 to send a full log of the marked table, embodiments of the invention can enable auto-correction on any database that may be limited to sending only change logs for replication to a replication server. This increases replication reliability because, as discussed above, replication server 130 is able to review a complete (or substantially complete) row change log to auto-correct replicated tables created at replicate database 120. Auto-correction is achieved by providing pairs of statements to replicate database 120 that delete data at a location identified by the insert and/or update operation prior to inserting data of the insert and/or update operation at the location. As discussed above, by deleting data stored at a location, embodiments of the invention automatically remove any corrupted data that may have been present at the location, prior to inserting data at the location, thereby auto-correcting a replicated table generated at replicate database 120. Because corrupted data is automatically removed, subsequent replication operations are not affected by the corrupted data. This results in increased replication reliability. Furthermore, auto-correction performed by the embodiments is accomplished in real-time (or on-the-fly) as a replicated table is being generated at replicate database 120. In this way, replication processes need not be interrupted.

As discussed above, an API at replication agent 140 enables a user or database administrator to conveniently configure auto-correction for tables marked for replication in primary database 110. In one embodiment, a user may, for example, provide the "ra_set_autocorrection" command to replication agent 140 to enable or disable auto-correction for one or more marked tables, and to return auto-correction status for the tables to the user.

The following exemplary command may be used to return auto-correction status for all marked tables or a specific table identified by "TABLE_NAME."

ra_set_autocorrection [all/TABLE_NAME/enable/disable]

The following exemplary command may be used to enable or disable auto-correction for a table identified by "TABLE_NAME."

ra set autocoaection TABLE_NAME, enable/disable

The following exemplary command may be used to enable or disable auto-correction for all marked tables.

ra_set_autocorrection all, enable/disable

In the above exemplary commands, "TABLE_NAME" refers to the name of a table to be queried to return auto-correction status or a table where auto-correction is to be enabled or disabled. The "all" keyword refers to all tables in primary database 110 and the "enable/disable" keyword may be used to enable or disable auto-correction for a marked table.

These example auto-correction commands are purely illustrative and are not intended to limit the invention and other command syntax and instructions may be used as well. Furthermore, in a non-limiting embodiment, replication agent 140 may be pre-configured to accomplish auto-correction and a user may not need to provide commands to replication agent 140 to configure auto-correction for one or more marked tables.

Figure 3:
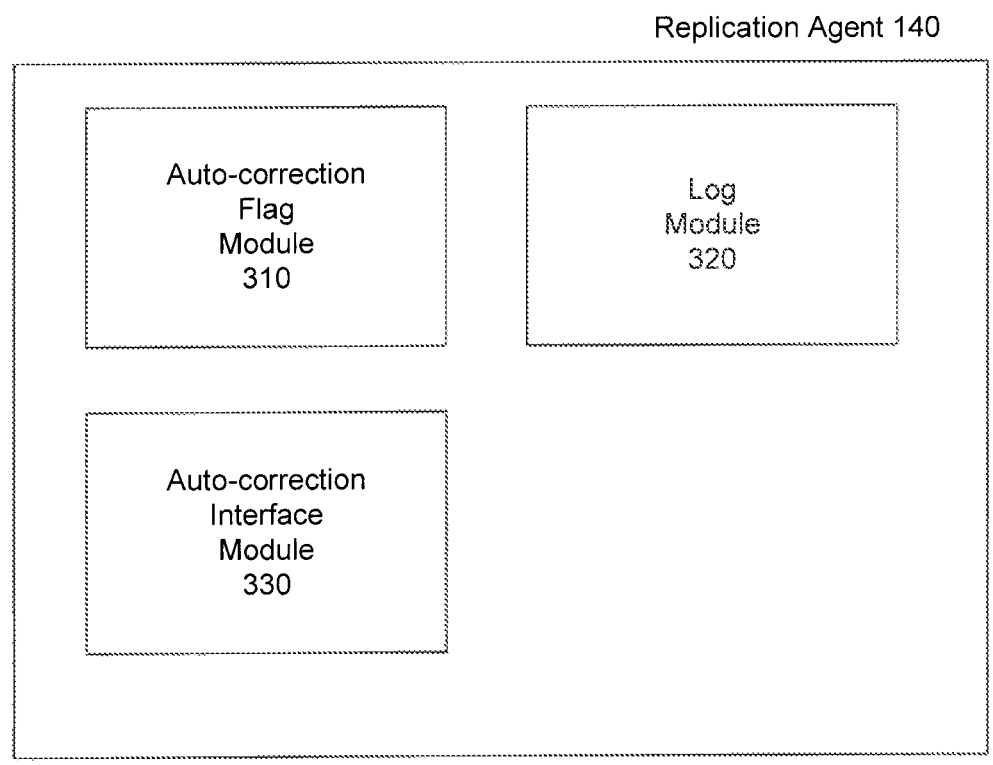
FIG. 3 is a diagram illustrating a replication agent, according to an embodiment.

In an embodiment, as shown in FIG. 3, replication agent 140 includes an auto-correction flag module 310 configured to check an auto-correction flag associated with a marked table. When auto-correction flag module 310 determines that an auto-correction flag has been set for a marked table, log module 320 sends all columns of the marked table, to replication server 130. In another embodiment, when auto-correction flag module 310 determines that an auto-correction flag has been set for the marked table, log module 320 sends a log record of each database row change on the marked table in primary database 110 to replication server 130.

In an embodiment, auto-correction interface module 330 is configured as an API that enables a user or database administrator to conveniently configure auto-correction for tables marked for replication in primary database 110. For example, the "ra_set_autocorrection" command may be parsed and executed by auto-correction interface module 330.

Figure 4:
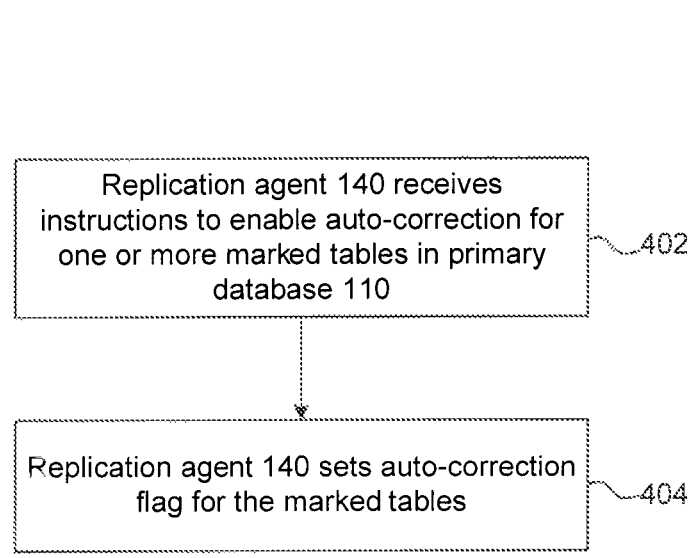
FIG. 4 is a flowchart illustrating an exemplary operation of a replication agent, according to an embodiment.

FIG. 4 is a flowchart illustrating method 400. Method 400 is an exemplary operation of replication agent 140, according to an embodiment.

Method 400 begins with replication agent 140 receiving instructions to enable auto-correction for one or more marked tables in primary database 110 (step 402). As an example, auto-correction interface module 330 in replication agent 140 receives and parses instructions (e.g., "ra set_autocorrection") to enable auto-correction.

Replication agent 140 sets an auto-correction flag for one or more marked tables specified in step 402 (step 404). As an example, auto-correction flag module 310 in replication agent may set respective auto-correction flags for the one or more marked tables in primary database 110. A method similar to method 400 may be used to reset respective auto-correction flags for the one or more marked tables in primary database 110.

By enabling or disabling auto-correction by directly providing commands to auto-correction interface module 330 in replication agent 140, a user need not interact with replication server 130 to manually correct replicated tables at replicate database 120 or even interact with or provide commands to primary database 110 in order to correct replicated tables at replicate database 120.

Figure 5:
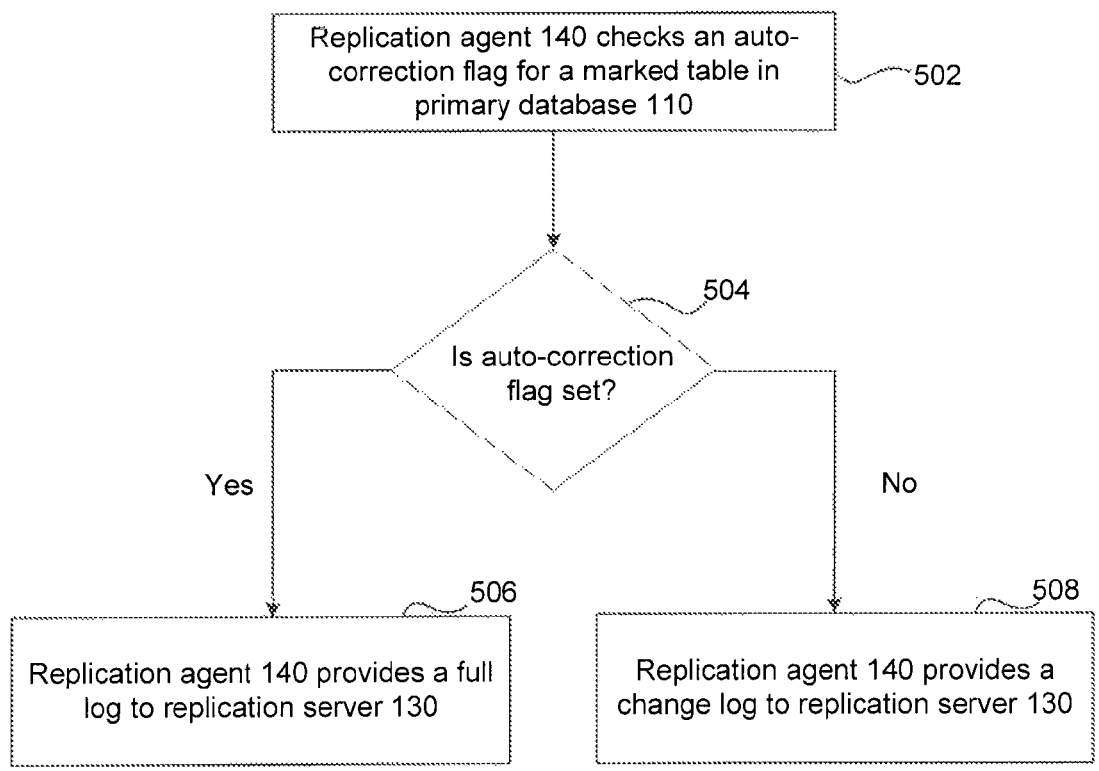
FIG. 5 is a flowchart illustrating another exemplary operation of a replication agent, according to an embodiment.

FIG. 5 is a flowchart illustrating method 500. Method 500 illustrates an exemplary operation of replication agent 140 based on checking of an auto-correction flag.

Method 500 begins with replication agent 140 checking an auto-correction flag for a marked table in primary database 110 (step 502). As an example, auto-correction flag module 310 in replication agent 140 may check an auto-correction flag for a marked table in primary database 110.

When replication agent 140 determines that the auto-correction flag is set (step 504), replication agent 140 sends all columns for every row changed in primary database 110 (or full log) to replication server 130 (step 506). As an example, auto-correction flag module 310 in replication agent 140 may determine that the auto-correction flag is set, causing log module 320 to provide a full log to replication server 130. As discussed above, replication server 130 reviews the full log to auto-correct replicated tables at replicate database 120.

Returning to step 504, when replication agent 140 determines that the auto-correction flag is not set, replication agent 140 determines that auto-correction is not enabled for the marked table. Therefore, replication agent 140 only changed columns for every row changed in primary database 110 (or change log) to replication server 130 (step 508).

Figure 6:
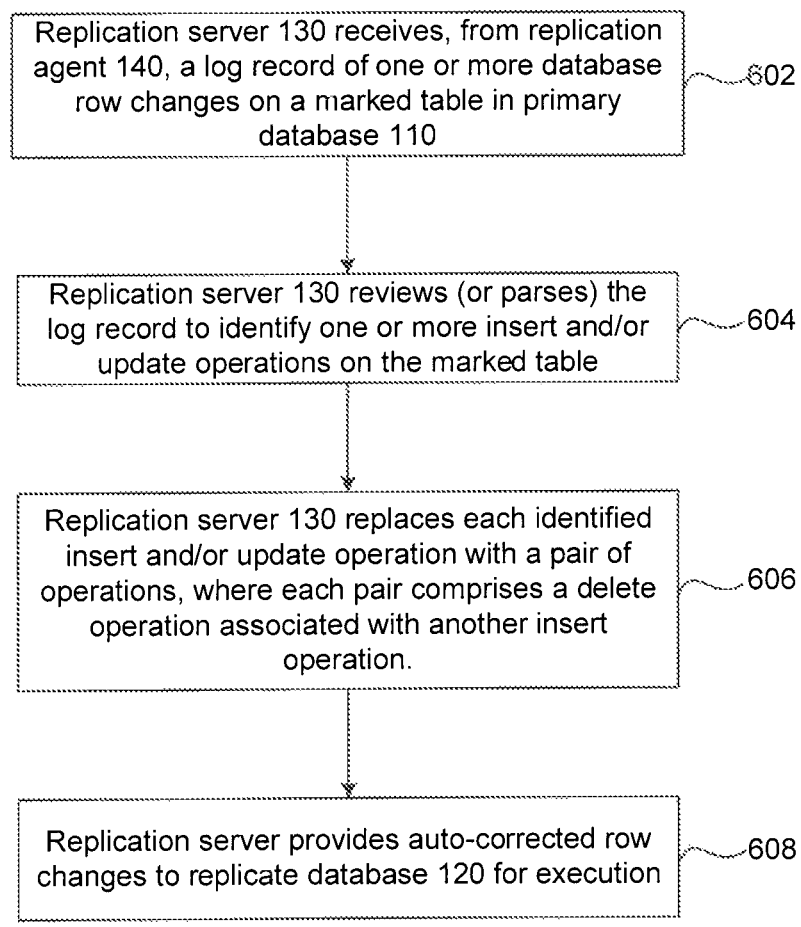
FIG. 6 is a flowchart illustrating an exemplary operation of a replication server, according to an embodiment.

FIG. 6 is a flowchart illustrating method 600. Method 600 illustrates an exemplary operation of replication server 130, according to an embodiment.

Method 600 begins with replication server 130 receiving, from replication agent 140, a log record of one or more database row changes on a marked table in primary database 110 (step 602). Such a log record can, for example, be sent by replication agent 140 to replication server 130 in step 506 of method 500 discussed above. Such a log record can, for example, be a full log.

Replication server 130 reviews (or parses) the log record to identify one or more insert and/or update operations on the marked table (step 604). As an example, operation identifier module 210 in replication server 130 reviews (or parses) the log record to identify one or more insert and/or update operations on the marked table.

Replication server 130 replaces each identified insert/update operation with a pair of operations, where each pair comprises a delete operation associated with another insert operation (step 606). As an example, auto-correction module 220 in replication server 130 replaces each identified insert/update operation with a pair of operations, where each pair comprises a delete operation associated with a new insert operation.

Replication server 130 provides updated (or auto-corrected) row changes to replicate database 120 where they may be executed to generate an auto-corrected table corresponding to the marked table (step 608).

EXAMPLE COMPUTER EMBODIMENT

Figure 7:
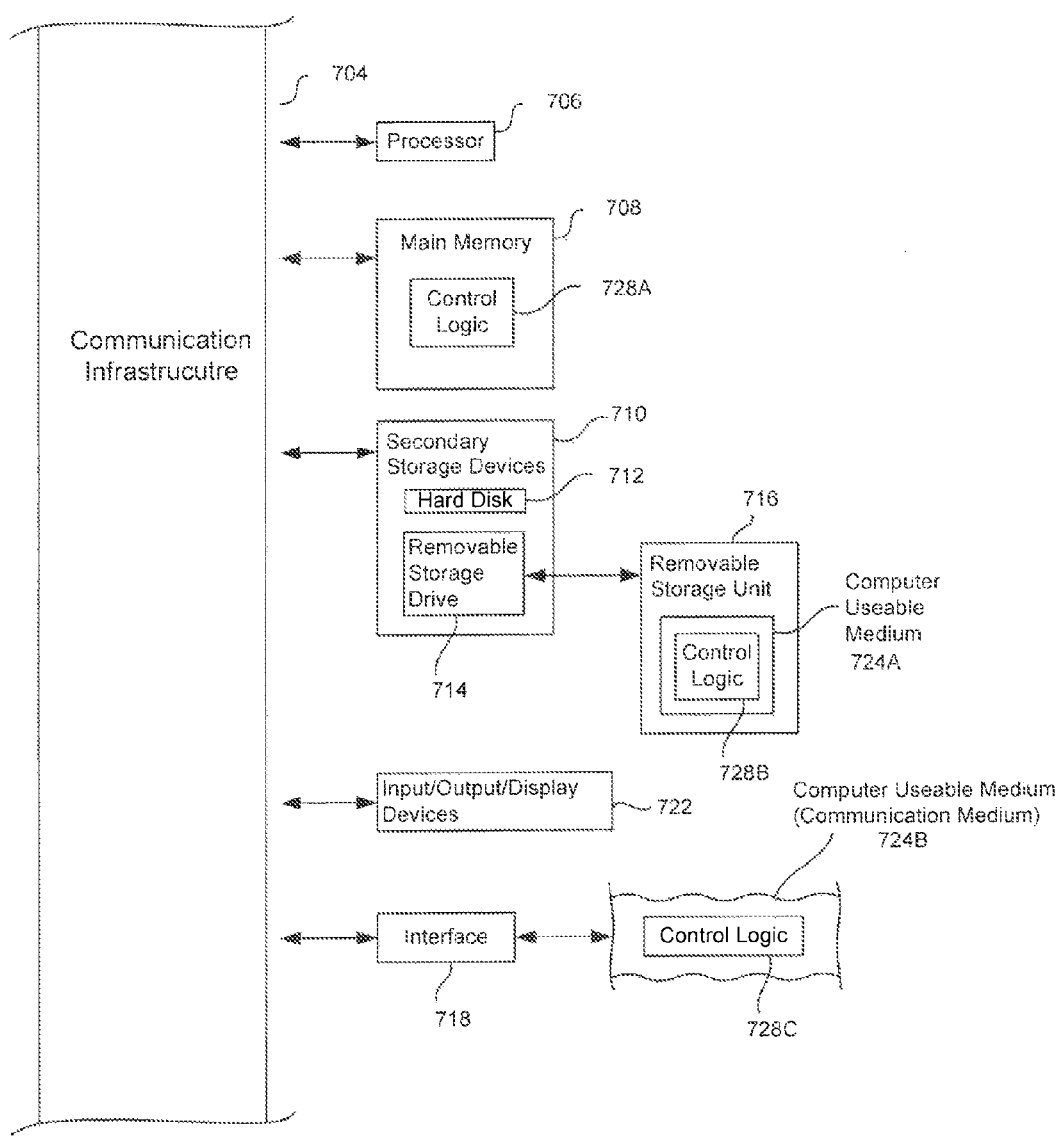
FIG. 7 illustrates an example computer useful for implementing components of the embodiments.

In an embodiment of the present invention, the system and components of embodiments described herein are implemented using well known computers, such as computer 702 shown in FIG. 7. For example, replication server 130, replication agent 140, primary database 110, replicate database 120, and any modules therein can be implemented using computer (s) 702.

The computer 702 can be any commercially available and well known computer capable of performing the functions described herein, such as computers available from International Business Machines, Apple, Sun, HP, Dell, Compaq, Cray, etc.

The computer 702 includes one or more processors (also called central processing units, or CPUs), such as a processor 706. The processor 706 is connected to a communication infrastructure 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well-known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B.

Any apparatus or manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed. by one or more data processing devices cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims, The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   identifying, from a log record, one or more predetermined operations on a database table marked for replication;
   automatically replacing each identified predetermined operation with a first pair of operations to operate on an auto-corrected replicated table; and
   generating the auto-corrected replicated table corresponding to said marked database table based upon said first pair of operations,
   wherein said predetermined operations comprise one or more insert operations and wherein each first pair further comprises a delete operation associated with a new insert operation, each first pair acting to delete data at a first location of the auto-corrected replicated table identified by said each identified insert operation prior to inserting data of said new insert operation at said first location of the auto-corrected replicated table.

2. The method of claim 1, wherein the generating further comprises:
   providing auto-corrected operations, including first pairs of operations each associated with respective identified insert operations, to a replicate database to generate the auto-corrected replicated table corresponding to said marked table.

3. The method of claim 1, further comprising:
   identifying, from said log record, one or more update operations on said marked table; and
   automatically replacing each identified update operation with a second pair of operations, each second pair comprising a new delete operation and a new insert operation, each second pair acting to delete data at a second location of the auto-corrected replicated table identified by said identified update operation prior to inserting data of said new insert operation at said second location of the auto-corrected replicated table.

4. The method of claim 1, wherein each first pair of operations operates on a row of said marked table.

5. The method of claim 1, wherein said log record including each database row change on said marked table is received when an auto-correction flag is set.

6. The method of claim 3, further comprising concurrently identifying said update operations and said insert operations from said log record.

7. A system, comprising:
   a memory configured to store modules comprising:
      a first module configured to identifying, from a log record, one or more predetermined operations on a database table marked for replication;
      a second module configured to automatically replace each identified predetermined operation with a first pair of operations to operate on an auto-corrected replicated table;
      a third module configured to generate an auto-corrected replicated table corresponding to said marked database table based upon said first pair of operations, wherein said predetermined operations comprise one or more insert operations and wherein each first pair further comprises a delete operation associated with a new insert operation, each first pair acting to delete data at a first location of the auto-corrected replicated table identified by said each identified insert operation prior to inserting data of said new insert operation at said first location of the auto-corrected replicated table; and
   one or more processors configured to process the modules.

8. The system of claim 7, further comprising:
a fourth module configured to provide auto-corrected operations, including first pairs of operations each associated with respective said identified insert operations, to a replicate database to generate an auto-corrected replicated table corresponding to said marked table.

9. The system of claim 7, further comprising:
a fourth module configured to identify, from said log record, one or more update operations on said marked table; and
a fifth module configured to automatically replace each identified update operation with a second pair of operations, each second pair comprising a new delete operation and a new insert operation, each second pair acting to delete data at a second location of the auto corrected replicated table identified by said identified update operation prior to inserting data of said new insert operation at said second location of the auto-corrected replicated table.

10. The system of claim 7, wherein each first pair of operations operates on a row of said marked table.

11. The system of claim 7, wherein said log record including each database row change on said marked table is received when an auto-correction flag is set.

12. The system of claim 9, further comprising a sixth module configured to concurrently identify said update operations and said insert operations from said log record.

13. A computer-readable storage device having instructions stored thereon, execution of which, by a computing device, cause the processing device to perform operations comprising:
identifying, from a log record, one or more predetermined operations on a database table marked for replication;
automatically replacing each identified predetermined operation with a first pair of operations to operate on the auto-corrected replicated table; and
generating the auto-corrected replicated table corresponding to said marked database table based upon said first pair of operations,
wherein said predetermined operations comprise one or more insert operations and wherein each first pair further comprises a delete operation associated with a new insert operation, each first pair acting to delete data at a first location of the auto-corrected replicated table identified by said each identified insert operation prior to inserting data of said new insert operation at said first location of the auto-corrected replicated table.

14. The computer-readable storage device of claim 13, wherein the generating further comprises:
providing auto-corrected operations, including first pairs of operations each associated with respective said identified insert operations, to a replicate database to generate the auto-corrected replicated table corresponding to said marked table.

15. The computer-readable storage device of claim 13, said operations further comprising:
identifying, from said log record, one or more update operations on said marked table; and
automatically replacing each identified update operation with a second pair of operations, each second pair comprising a new delete operation and a new insert operation, each second pair acting to delete data at a second location of the auto-corrected replicated table identified by said identified update operation prior to inserting data of said new insert operation at said second location of the auto-corrected replicated table.

16. The computer-readable storage device of claim 13, wherein each first pair of operations operates on a row of said marked table.

17. The computer-readable storage device of claim 13, wherein said log record including each database row change on said marked table is received when an auto-correction flag is set.

* * * * *